US010377021B2

(12) United States Patent
Kumar et al.

(10) Patent No.: US 10,377,021 B2
(45) Date of Patent: Aug. 13, 2019

(54) SMART POWER TOOL

(71) Applicant: Wipro Limited, Bangalore (IN)

(72) Inventors: Vijay Kumar, Bangalore (IN); Thomas Chittakattu Ninan, Angadikadavu (IN)

(73) Assignee: Wipro Limited, Bangalore (IN)

( * ) Notice: Subject to any disclaimer, the term of this patent is extended or adjusted under 35 U.S.C. 154(b) by 74 days.

(21) Appl. No.: 15/420,371

(22) Filed: Jan. 31, 2017

(65) Prior Publication Data

US 2018/0161965 A1 Jun. 14, 2018

(30) Foreign Application Priority Data

Dec. 12, 2016 (IN) ............................ 201641042323

(51) Int. Cl.

| | |
|---|---|
| ***B25F 5/02*** | (2006.01) |
| ***B25H 1/00*** | (2006.01) |
| ***B23P 19/10*** | (2006.01) |
| ***B25B 21/00*** | (2006.01) |
| ***G05B 19/18*** | (2006.01) |

(52) U.S. Cl.

CPC .......... *B25B 21/002* (2013.01); *B23P 19/105* (2013.01); *B25F 5/021* (2013.01); *B25H 1/0078* (2013.01); *G05B 19/186* (2013.01); *G05B 2219/37114* (2013.01)

(58) Field of Classification Search

CPC .................. B25F 5/021; G05B 19/186; G05B 2219/37114; B25B 21/002

USPC ........................................................ 700/114

See application file for complete search history.

(56) References Cited

U.S. PATENT DOCUMENTS 3,824,674 A 7/1974 Inoyama et al.
3,893,217 A 7/1975 Edmond
(Continued)

FOREIGN PATENT DOCUMENTS

CN 87200576 2/1988
CN 203918893 11/2014
(Continued)

OTHER PUBLICATIONS

Extended European Search Report issued in the European Patent Office in counterpart European Application No. 17161225.2, dated Oct. 11, 2017, 5 pages.

*Primary Examiner* — Ziaul Karim
(74) *Attorney, Agent, or Firm* — Finnegan, Henderson, Farabow, Garrett & Dunner, LLP

(57) ABSTRACT

The present disclosure discloses a drive tool. The drive tool comprising a handle, a bit movably coupled to the handle through a mechanism. The drive tool further comprises a plurality imaging units provisioned on the handle to face a fastener and a fastening surface. The drive tool also comprises a control unit operatively coupled to the mechanism and the plurality of imaging units. The control unit is configured to receive data from each of the plurality of imaging units and operate the mechanism selectively to move the bit for adjusting axis of the fastener perpendicular to the fastening surface. The adjustment is done based on the data received from at least one of the plurality of imaging units. The automatic alignment of axis of the fastener with respect to the fastening surface improves the accuracy of operation and reduces the efforts of the operator.

13 Claims, 4 Drawing Sheets

(56) References Cited

U.S. PATENT DOCUMENTS

| | | | | |
|---|---|---|---|---|
| 6,301,997 | B1 * | 10/2001 | Welte | B25B 21/00 33/263 |
| 2002/0164217 | A1 * | 11/2002 | Peterson | B25H 1/0092 408/1 R |
| 2005/0161241 | A1 * | 7/2005 | Frauhammer | B25F 5/00 173/1 |
| 2006/0074525 | A1 * | 4/2006 | Close | B25J 9/1617 700/245 |
| 2013/0196574 | A1 * | 8/2013 | Santure | B24C 3/04 451/38 |
| 2014/0005807 | A1 * | 1/2014 | Busschaert | G05B 19/02 700/83 |
| 2014/0222012 | A1 | 8/2014 | Belkoff et al. | |
| 2016/0046010 | A1 * | 2/2016 | Busscharet | B25F 5/021 700/168 |

FOREIGN PATENT DOCUMENTS

| | | |
|---|---|---|
| EP | 2 308 648 | 4/2011 |
| ER | 2 073 590 | 7/2009 |
| JP | 2011-131330 | 7/2011 |

* cited by examiner

SMART POWER TOOL

FIELD OF THE INVENTION

Present disclosure generally relates to a category of drive tools. Particularly, but not exclusively the present disclosure relates to an automated drive tool. Further embodiments of the present disclosure disclose a smart drive tool having an arrangement for operating a fastener with respect to a fastening surface.

BACKGROUND

A drive tool is a device which may be commonly used in wide variety of applications including industrial, construction, maintenance, plumbing, carpentry, and the like. The drive tool may be operated either with aid of power, categorized under power tools or may be operated manually. The drive tools which are operated manually, requires skill of an operator and result of such use of drive tool depends entirely on the skill of operator. While, the use of manually operated drive tools may be acceptable in some applications, in a wide variety of other applications reliability on labour skill may not be acceptable. Hence, with the advent of technology and given advantages, usage of the power tools is gaining popularity. The power tool is a tool that is actuated by an additional power source and mechanism. The most common type of mechanism used to drive the power tools is electric motor.

One such commonly used drive tool is a screwdriver which may be used for the purposes of driving fasteners or screws. A typical screwdriver has a handle and a shaft, and a tip of the shaft may be inserted into the screw head to turn the screw manually. Such, manual screwdrivers need skilled operators for aligning orientation of the screw and manual effort for driving the screw. Thus, the perfection and quality of screw fitment is mainly dependent on the skill of the operator. To overcome some limitations of manual screw drivers, powered screw drivers have been developed and used in the art. The powered screw drivers include a means for rotating the shaft of the screw driver, and thereby eliminates the manual effort required for driving the screw.

Conventionally known power screwdrivers may include torque sensor for measuring the torque requirement and accordingly motorized mechanism may be used to input required torque. However, operation of conventionally known power screwdrivers still depends on skill of the operator which may lead to manual deficiencies. Additionally, since the conventional technologies involve manual intervention, the time taken for operation of such tools may be high.

The present disclosure is directed to overcome one or more limitations stated above.

SUMMARY

One or more shortcomings of the conventional drive tools are overcome and additional advantages are provided through the present disclosure. Additional features and advantages are realized through the techniques of the present disclosure. Other embodiments and aspects of the disclosure are described in detail herein and are considered a part of the claimed disclosure.

In a non-limiting embodiment of the disclosure, a drive tool has been disclosed. The drive tool comprising a handle, a bit movably coupled to the handle through a mechanism. The drive tool further comprises a plurality imaging units provisioned on the handle to face a fastener and a fastening surface. There is a control unit operatively coupled to the mechanism and the plurality of imaging units. The control unit is configured to receive data from each of the plurality of imaging units and operate the mechanism selectively to move the bit for adjusting axis of the fastener perpendicular to the fastening surface. The adjustment is done based on the data received from at least one of the plurality of imaging units.

In an embodiment, the mechanism comprises a first actuator and a second actuator to move the bit in lateral and longitudinal directions based on the signal received from the plurality of imaging units. The drive tool further comprises a third actuator coupled to the bit to fasten the fastener.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING FIGURES

The accompanying drawings, which are incorporated in and constitute a part of this disclosure, illustrate exemplary embodiments and, together with the description, serve to explain the disclosed principles. The same numbers are used throughout the figures to reference like features and components. Some embodiments of device and/or methods in accordance with embodiments of the present subject matter are now described, by way of example only, and with reference to the accompanying figures, in which.

Figure 2:
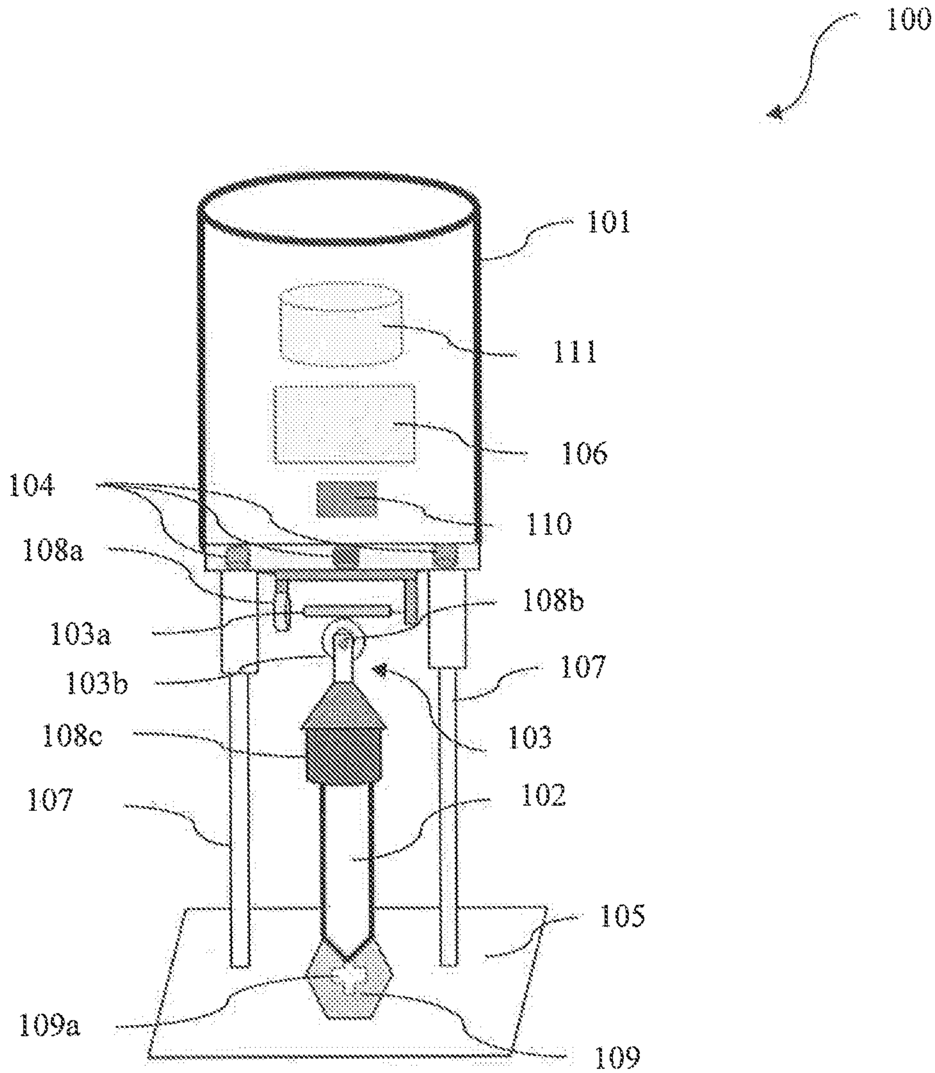
FIG. 2 shows a schematic representation of the drive tool in accordance with some embodiments of the present disclosure.
Figure 3A:
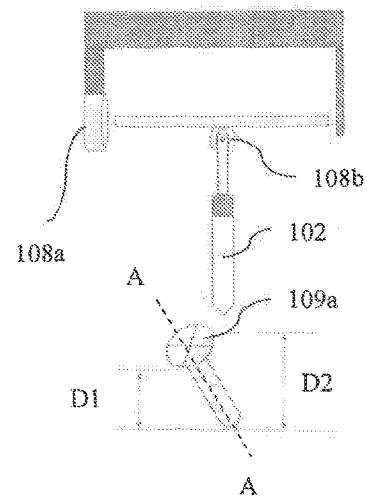
Figure 3B:
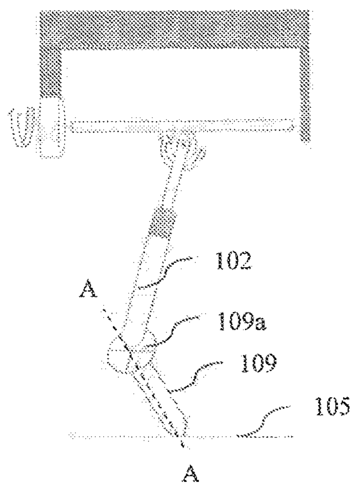
Figure 3C:
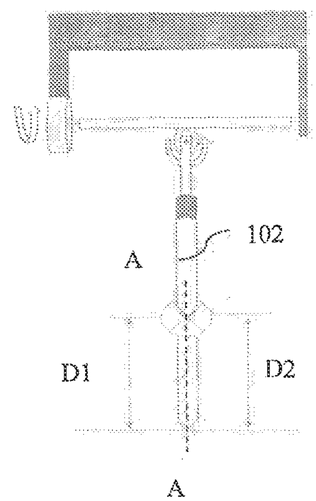
Figure 4:
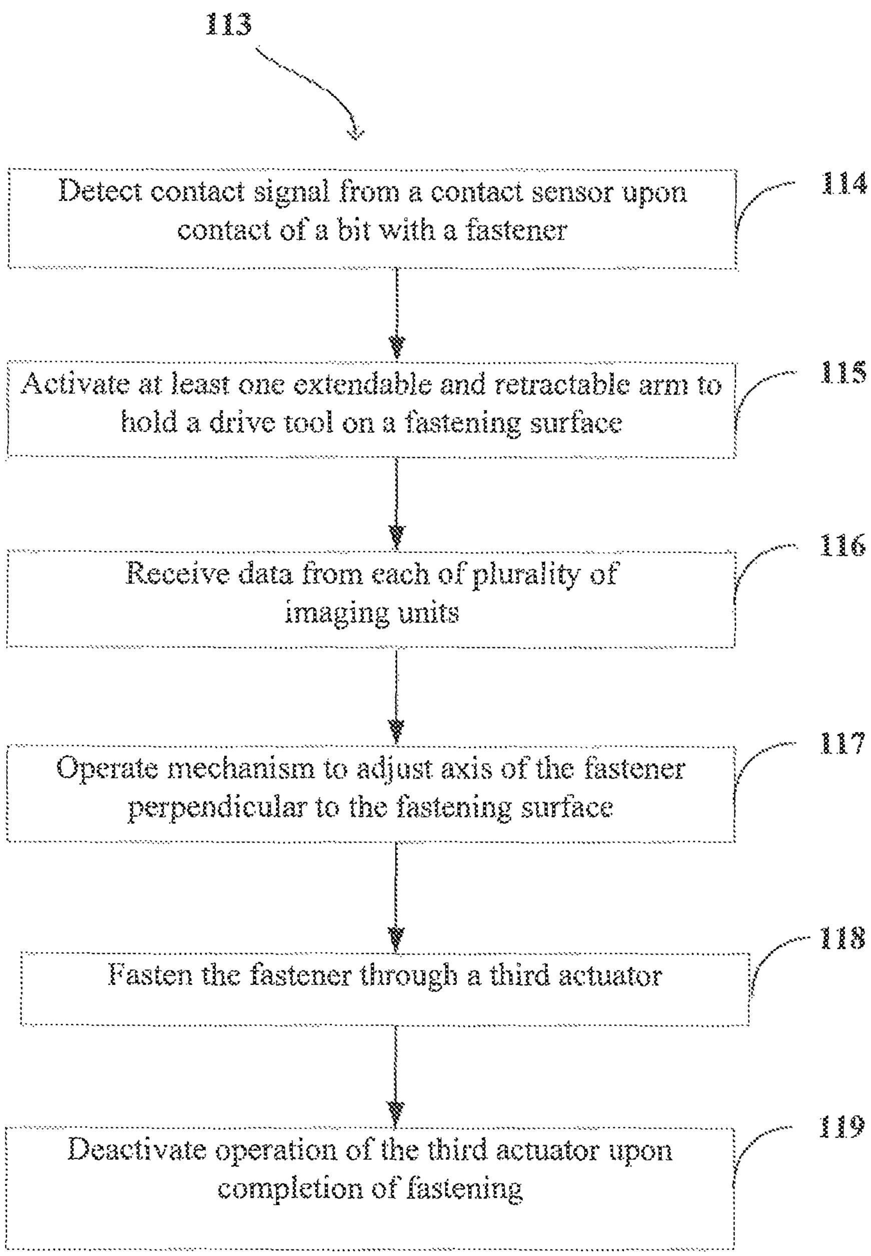

FIG. 3*a*, FIG. 3*b* and FIG. 3*c* shows exemplary representations of different stages of operation of a mechanism in the drive tool of FIG. 2 in accordance with some embodiments of the present disclosure; and FIG. 4 illustrates a flowchart showing method to align and drive the drive tool to operate the fastener with respect to a fastening surface in accordance with some embodiments of the present disclosure.

It should be appreciated by those skilled in the art that any block diagrams herein represent conceptual views of illustrative device embodying the principles of the present subject matter. Similarly, it will be appreciated that any flow charts, flow diagrams, state transition diagrams, and the like represent various processes which may be substantially represented in computer readable medium and executed by a computer or processor, whether or not such computer or processor is explicitly shown.

DETAILED DESCRIPTION

In the present document, the word “exemplary” is used herein to mean “serving as an example, instance, or illustration.” Any embodiment or implementation of the present subject matter described herein as “exemplary” is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure discloses a smart drive tool such as but not limited to screwdriver. In an embodiment, the drive tool may be power driven to adjust orientation of fastener and subsequently fasten or unfasten the fastener with respect to fastening surface. The configuration of automatic alignment and fastening or unfastening in the drive tool of the present disclosure overcomes some of the problems including dependency on skill of operator of the drive tool.

The drive tool of the present disclosure comprises a handle, to enable user to hold the drive tool during its operation. The drive tool further comprises a bit, which is coupled to the handle through a mechanism. In an embodiment, the drive tool is a screwdriver, wherein the bit of the screwdriver is made of a steel and there may be a tip which is hardened to resist wear and the tip may be inserted into screw head to turn it. In one embodiment of the present disclosure, the bit is coupled to the handle, such that the bit may be movably adjusted through the mechanism. The drive tool also comprises a plurality of imaging units, which face the fastener and a fastening surface on which the fastener is to be fastened or from which the fastener is to be removed. In an embodiment, the plurality of imaging units is RGB-D camera.

The drive tool further comprises a control unit operatively coupled with the mechanism and the plurality of imaging units. The control unit is configured to receive data from each of the plurality of imaging units, the data may be in the form of distance between the fastening surface and different faces of head of the fastener. The data, so received by the control unit may be different from each of the plurality of imaging units, indicating that there is a tilt in axis of the fastener with respect to the fastening surface. For effective fastening or unfastening, the fastener and also the bit are to be perpendicular to the fastening surface. This perpendicularity is realized through the control unit which operates the mechanism to move the bit and adjust the axis of the fastener in a direction perpendicular to the fastening surface. The control unit identifies the perpendicular condition based on the inputs received from the plurality of imaging units. In an embodiment, the fastening surface is perpendicular to the axis of the fastener or the screw, when the distance data between the fastening surface and different faces of head of the fastener is found to be equal. Thus, when the distance is found to be equal, the control unit interprets it as removal of tilts and stops the operation of the mechanism. Subsequently, the fastener is fastened to the fastening surface.

In an embodiment, once the fastener is aligned perpendicular to the fastening surface, the distance data between different faces of the fastener and the fastening surface may also be used in identification of the completion of fastening operation. In an embodiment, the fastening operation may be considered to be completed when the distance between the fastening surface and the head of the fastener is zero. Further, in another embodiment of the disclosure, an accelerometer may be used to identify completion of the fastening or the unfastening operation by detecting sudden change in acceleration at the end of fastening or unfastening operation.

In the following detailed description of the embodiments of the disclosure, reference is made to the accompanying figures that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
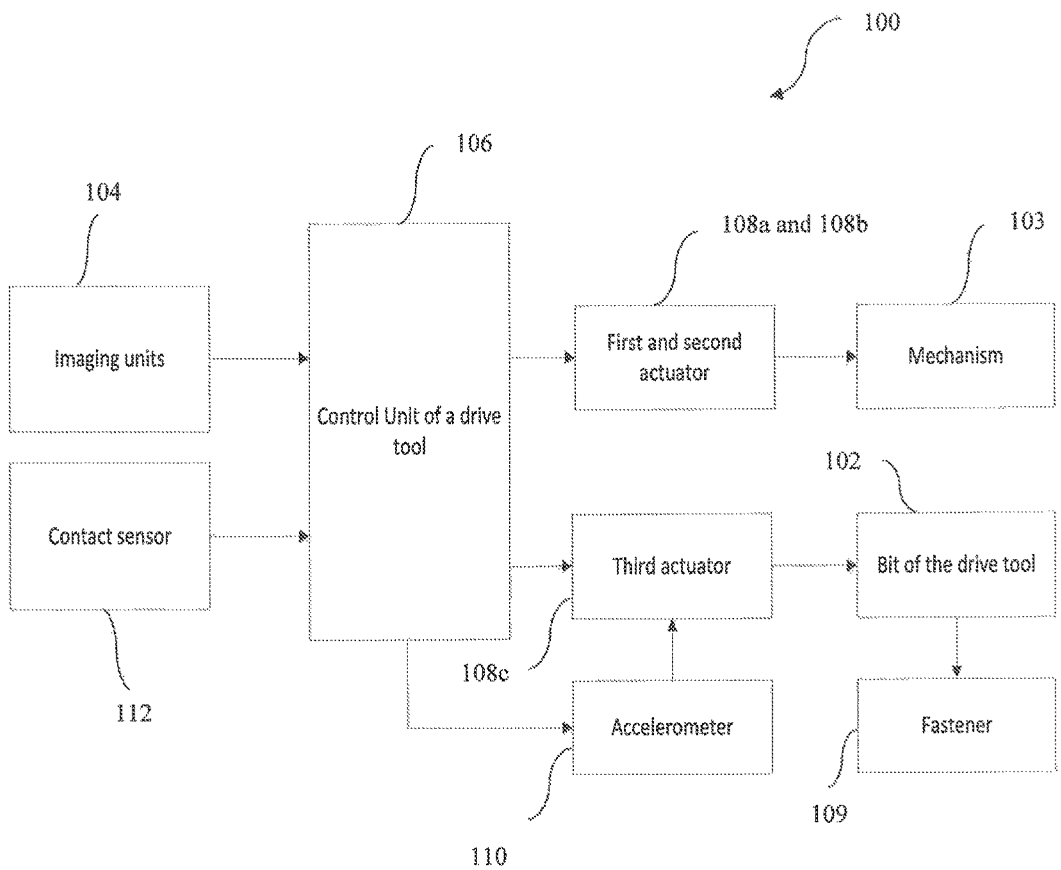
FIG. 1 shows a block diagram of components of a drive tool in accordance with some embodiments of the present disclosure.

FIG. 1 shows a block diagram, illustrating components of a drive tool 100 which may automatically align and drive the fastener with respect to the fastening surface in accordance with some embodiments of the present disclosure.

In an exemplary implementation, as shown in FIG. 1, the drive tool 100 comprises a control unit 106, plurality of imaging units 104, a contact sensor 112, a first actuator 108*a* and a second actuator 108*b*, a third actuator 108*c*, a mechanism 103 in addition to handle 101 and a bit 102.

As shown in FIG. 1, the contact sensor 112 of the drive tool 100 is configured to detect contact between the bit 102 and a fastener 109. In an embodiment of the present disclosure, the bit 102 comes in contact with a head portion 109*a* (shown in FIG. 2) of the fastener 109. The contact sensor 112 is provisioned on the bit 102 and in one embodiment the contact sensor 112 may be provisioned at a tip of the bit 102. The contact sensor 112 is interfaced with the control unit 106 of the drive tool 100 and upon detection of the fastener 109, the contact sensor 112 generates a signal to the control unit 106. The signal received by the control unit 106 acts as an indication to activate at least one extendable and retractable arm 107 (shown in FIG. 2). In an embodiment, the extendable and retractable arm 107 extends from a handle 101 (shown in FIG. 2) till a fastening surface 105 (shown in FIG. 2) to support the drive tool 100 during fastening and unfastening operation of the fastener 109.

Further, as shown in FIG. 1, the drive tool 100 comprises a plurality of imaging units 104. In an embodiment, the plurality of imaging units 104 may be mounted on the handle 101 of the drive tool, and the plurality of imaging units 104 includes RGB-D camera. The RGB-D camera, also referred to as depth camera, is used to obtain depth information. The plurality of imaging units 104 are interfaced with the control unit 106 and are configured to generate data to be transmitted to the control unit 106. In one embodiment, at least two imaging units 104 are provisioned on the handle 101 facing the fastening surface 105 and the fastener 109. However, one should not construe the number of imaging units 104 as a limitation, as any number of imaging units may be provided on the handle 101 to serve the purpose. In an embodiment, each of the plurality imaging units 104 is configured to measure distance between the fastening surface 105 and different faces of head of the fastener 109*a*. The distance data is received by the control unit 106 to identify if there is any tilt in the axis A-A (shown in FIG. 3) of the fastener 109 with respect to the fastening surface 105. For example, if at least one of the plurality of imaging units 104 generate distance data different from the other, the control unit 106 may interpret the same as a tilt in the axis A-A of the fastener 109 with respect to the fastening surface 105. A person skilled in the art would understand that the distance data mentioned above may also include various other distance data and is not limited to the things mentioned herein.

To effectively fasten the fastener 109 onto the fastening surface 105 or during unfastening, the axis A-A of the fastener 109 is to be perpendicular to the fastening surface 105. To achieve this, the drive tool 100 is provisioned with the mechanism 103 coupled to the handle 101 and the bit 102. In an embodiment, the mechanism 103 is actuated by the control unit 106 through a first actuator 108*a* and a second actuator 108*b*. The mechanism 103 may be configured to move the bit 102 laterally and longitudinally to adjust the axis A-A of the fastener 109 perpendicular to the fastening surface 105. In an embodiment, the first actuator 108*a* may be used to move the bit 102 laterally and the second actuator 108*b* to move the bit longitudinally. Hence, upon analysis by the control unit 106, if there is a tilt in the axis A-A of the fastener 109 or screw with respect to the fastening surface 105, the mechanism 103 operates the bit 102 until the axis A-A of the fastener 109 is brought to a position perpendicular to the fastening surface 105.

In an embodiment, the drive tool 100 is subsequently used to fasten the fastener 109 to the fastening surface 105 or may be used to unfasten the fastener 109 from the fastening surface 105. The operation of fastening is carried out once axis A-A of the fastener 109 is aligned perpendicular to the fastening surface 105. The fastening of the fastener 109 is done through the third actuator 108*c* upon activation by the control unit 106. The third actuator 108*c* rotates the fastener 109 to fasten to the fastening surface 105. In an embodiment, the plurality of imaging units 104 or an accelerometer 110 may be used by the drive tool 100 to identify the completion of fastening or unfastening operation. In one embodiment, the plurality of imaging units 104 may continuously measure distance between the head portion of the fastener 109*a* and the fastening surface 105 and is fed to the control unit 106. The control unit 106 analyses these values and upon distance reaching the value of zero which is an indication of the completion of fastening operation, the third actuator 108*c* is deactivated by the control unit 106. Further, in case of accelerometer 110, completion of fastening or unfastening operation may be identified by the control unit 106 by detecting change in acceleration of the drive tool 100. The accelerometer 110 interfaced with the control unit 106 is configured to receive data from the accelerometer 110 continuously, and when there is a substantial change in these values, the third actuator 108*c* is deactivated. The substantial change in acceleration, occurs when the fastener 109 is completely fastened to the fastening surface 105 or after completion of unfastening.

In an embodiment, the drive tool 100 is a screwdriver, the screwdriver used to fasten the screw on the screwing surface or unscrew from the screwing surface. It is to be understood that, the drive tool 100 of the present disclosure, may be used in other applications as well and use as a screwdriver should not be construed as any form of limitation of the present disclosure.

Referring now to FIG. 2, it shows a schematic representation of the drive tool 100 in accordance with some embodiments of the present disclosure. As shown in FIG. 2, the drive tool 100 comprises a handle 101 to enable the user to hold the tool 100 during its operation. The drive tool 100 further comprises a bit 102, which is coupled to the handle 101 through a mechanism 103. In an embodiment, the bit 102 comes in direct contact with the fastener 109 or particularly with a head of the fastener 109*a*. The contact of the bit 102 with the head of the fastener 109*a* may be sensed by the contact sensor 112. In an embodiment, the contact sensor 112 may be one of resistive or capacitive sensors which causes change in resistance or capacitance upon contact with the fastener 109. The contact sensor 112 is interfaced with the control unit 106 and the control unit 106 upon receiving contact signal activates an extendable and retractable arm 107 to extend from the handle 101 to the fastening surface 105. In an embodiment of the disclosure, the drive tool 100 comprises a pair of extendable and retractable arms 107 extending parallel to the bit 102. The extendable and retractable arm 107 supports the drive tool 100 on the fastening surface 105 and ensures that there is no movement of the drive tool 100 during the fastening or unfastening operation. In an embodiment, the extendable and retractable arm 107 may be mechanically operated, or actuated hydraulically or pneumatically actuated with the aid of a power source 111. The extendable and retractable arm 107 may use air suction to stick to the fastening surface 105. The extendable and retractable arm 107 may also have a housing 107*a* and a resilient member [not shown] may be disposed in the housing. The resilient member may be a compression spring which is configured to compress when the drive tool 100 is operated towards the fastening surface 105, and retract when the force on the drive tool 100 is released. In one embodiment, the extendable and retractable arm 107 may be a telescopic arm. In one embodiment, the drive tool 100 may be a screwdriver, wherein the bit 102 of the screwdriver is made of a tough steel and there may be a tip which is hardened to resist wear. The tip is inserted into screw head to turn it and fasten or unfasten with respect to a fastening surface 105.

In one embodiment of the present disclosure, the bit 102 may be coupled to the handle 101 such that the bit 102 may be movably adjusted through the mechanism 103. In one embodiment, the mechanism 103 used may be a universal joint mechanism. The mechanism 103 comprises a bar 103*a* coupled to the first actuator 108*a*, and a flange 103*b* joined to the bar 103*a*. The flange 103*b* extends downwardly from the bar 103*a*, and houses a second actuator 108*b*. The bit 102 of the drive tool 100 is movably coupled to the second actuator 108*b*. In an embodiment, the first actuator 108*a* and second actuator 108*b* rotates to provide lateral and longitudinal directional movement to the bit 102 of the drive tool 100. The drive tool 100 also comprises a plurality of imaging units 104 provided on the handle 101 facing the fastener 109 and the fastening surface 105 on which the fastener 109 is to be fastened or from which the fastener 109 is to be removed. In an embodiment, the plurality of imaging units 104 may be RGB-D cameras.

Further, as described in description of FIG. 1, the drive tool 100 further comprises a control unit 106 operatively coupled with the mechanism 103 and the plurality of imaging units 104. The control unit 106 may be configured to receive data from each of the plurality of imaging units 104 which is configured to measure distance between the fastening surface 105 and one or more faces on the head of the fastener 109*a*. The control unit 106 receives the distance data from the plurality of imaging units 104, and checks the orientation of the fastener 109 or screw with respect to the fastening surface 105. In an embodiment, the control unit 106 identifies tilt in the axis A-A of fastener 109 with respect to the fastening surface 105. For example, if at least one of the plurality of imaging units 104 generate distance data different from the other, the control unit 106 may interpret the same as a tilt in the axis A-A of the fastener 109 with respect to the fastening surface 105. In an embodiment, for effective fastening or unfastening, the fastener 109 and the bit 102 are to be perpendicular to the fastening surface 105. This perpendicularity and removal of tilt may be realized through the control unit 106 which operates the mechanism 103 by providing lateral and longitudinal movement of the bit 102 with respect to the fastening surface 105. The lateral and longitudinal movements may be provided through the first and second actuators 108*a* and 108*b*. This way the axis A-A of the fastener 109 is adjusted in a direction perpendicular to the fastening surface 105. The control unit 106 identifies the perpendicular condition based on the inputs received from the plurality of imaging units 104. In an embodiment, the fastening surface 105 is perpendicular to the axis A-A of the fastener 109, when the distance data between the fastening surface 105 and each of the different faces of the head of the fastener 109*a* is found to be equal. Thus, when the distance is found to be equal, the control unit 106 stops the operation of the first and second actuators 108*a* and 108*b* and subsequently the fastener 109 is fastened to the fastening surface 105 by the operation of the bit 102 through the third actuator 108*c*.

In an embodiment, the plurality of imaging units 104 may also be used in identification of the completion of fastening operation. In an embodiment, the fastening operation may be considered complete, when the distance between the fastening surface 105 and the head of the fastener 109*a* is zero. Further, in another embodiment of the disclosure, an accelerometer 110 may also be used to identify completion of fastening or unfastening operation by detecting instant change in acceleration which typically occurs at the end of fastening or unfastening operation of the drive tool 100. The signal from the accelerometer 110 may be used by the control unit 106 to stop the operation of the third actuator 108*c*. In an embodiment, the necessary power for operation of different components of the drive tool 100, which includes the plurality of depth sensors 104, the contact sensors 112, the control unit 106, the at least one first actuator 108*a*, the second actuator 108*b* and the third actuator 108*c* may be provided by the power source 111. The power source 111 may be a battery which is rechargeable, or a replaceable battery.

Referring now to FIG. 3*a*, FIG. 3*b* and FIG. 3*c*, these figures show exemplary representations of different stages of operation of the mechanism 103 in the drive tool 100 in accordance with some embodiments of the present disclosure.

As shown in FIG. 3*a*, initially the distance measured by the plurality of imaging units 104 between the fastening surface 105 and different faces of the head of the fastener 109*a*, represented herein as D1 and D2 are different. In an embodiment, two faces of the head of the fastener 109*a* are considered for simplicity, however, more than two faces may be considered for measuring distance between the fastening surface 105 and the head of the fastener 109*a*. The distance D1 and D2 are measured from the head portion 109*a* of the fastener 109 and the fastening surface 105. The varying distances, is an indication that there is a tilt in the fastener 109 with respect to the fastening surface 105. The control unit 106 upon receiving this data and identifying the tilt of the fastener 109, the control unit 106 activates the at least one first actuator 108*a* and the second actuator 108*b* to actuate the mechanism 103.

As depicted in FIG. 3*b*, the at least one first actuator 108*a* and second actuator 108*b* rotates to provide lateral and longitudinal directional movement to the bit 102 of the drive tool 100. The bit 102 in FIG. 3*b*, is moved laterally to come in contact with the head of the fastener 109*a*. In another embodiment, the bit 102 may be moved laterally and longitudinally to come in contact with the head of the fastener 109*a*.

Further, as shown in FIG. 3*c*, the bit 102 is moved laterally again, along with the fastener 109 to make the axis A-A of the fastener 109 perpendicular to the fastening surface 105 to ensure effective fastening operation from then on. As shown in FIG. 3*c*, the distance D1 is equal to D2, which is an indication to the control unit 106 that the fastener 109 is perpendicular to the fastening surface 105 and there are no tilts in the drive tool 100.

FIG. 4 illustrates a flowchart showing method for adjusting the drive tool 100 to fasten the fastener 109 in accordance with some embodiments of the present disclosure.

As illustrated in FIG. 4, the method 113 comprises one or more blocks for adjusting the drive tool 100 and fastening or unfastening the fastener 109. The method 113 may be described in the general context of computer executable instructions. Generally, computer executable instructions can include routines, programs, objects, components, data structures, procedures, modules, and functions, which may perform particular functions or implement particular abstract data types.

The order in which the method 113 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 114, a contact sensor 112 of the drive tool 100 is configured to sense contact of a bit 102 of the drive tool 100 with a fastener 109, particularly head of the fastener 109*a*. Upon contact, the contact sensor 112 sends a contact signal to the control unit 106 for its detection.

At block 115, once the contact has been detected by the control unit 106, the control unit 106 activates at least one extendable and retractable arm 107 to extend from the handle 101 to a fastening surface 105 to support the drive tool on the fastening surface 105.

At block 116, a plurality of imaging units 104 provisioned in the handle of the drive tool 100 are configured to generate data related to distance between the fastening surface 105 and different faces of the head of the fastener 109*a*. The distance data, so generated by the plurality of imaging units 104 are received by the control unit 106 to identify tilt in the axis A-A of the fastener 109 or screw, if any.

At block 117, if any tilts are identified by the control unit 106, it operates a mechanism 103 to adjust axis A-A of the fastener 109 perpendicular to the fastening surface 105. In an embodiment, the mechanism 103 may be a universal joint mechanism. In an embodiment, for effective fastening or unfastening, the fastener 109 and the bit 102 are to be perpendicular to the fastening surface 105. Hence, the mechanism 103 adjusts the fastener 109 with lateral and longitudinal movement of the bit 102 to make it perpendicular to the fastening surface 105.

At block 118, upon adjusting of the fastener 109 by the mechanism 103, the control unit 106 actuates a third actuator 108*c* to carry out the process of fastening or unfastening the fastener 109 with respect to the fastening surface 105. The third actuator 108*c* turns the fastener 109 to fasten the fastener 109 on the fastening surface 105.

At block 119, once the operation of fastening or unfastening of the fastener 109 is complete, the third actuator 108*c* is deactivated by the control unit 106. In an embodiment, the plurality of imaging units 104 or an accelerometer 110 may be used (as described in FIG. 2 description) by the drive tool 100 to identify the completion of fastening operation.

In an embodiment of the disclosure, the control unit 106 of the drive tool 100 may include specialized processing units such as integrated system (bus) controllers, memory management control units, floating point units, graphics processing units, digital signal processing units, etc. The processing unit may include a microprocessor, such as AMD Athlon, Duron or Opteron, ARM's application, embedded or secure processors, IBM PowerPC, Intel's Core, Itanium, Xeon, Celeron or other line of processors, etc. The control unit may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), microcontroller, etc.

In some embodiments, the control unit 106 may be disposed in communication with one or more memory devices (e.g., RAM, ROM etc.) via a storage interface. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computing system interface (SCSI), etc. The memory drives may further include a drum, magnetic disc drive, magneto-optical drive, optical drive, redundant array of independent discs (RAID), solid-state memory devices, solid-state drives, etc.

Advantages of the Embodiment of the Present Disclosure are Illustrated Herein In an embodiment, the present disclosure discloses a drive tool to fasten or unfasten the fastener with respect to the fastening surface.

In an embodiment, the drive tool of the present disclosure may be sued to align the fastener perpendicular to the fastening surface to ensure effective and quick fastening or unfastening operation.

In an embodiment, the present disclosure provides an automatic method of aligning the drive tool and fasten or unfasten the fastener, thus eliminating the requirement of a skilled operator.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral Numerals:

| Reference Number | Description |
|---|---|
| 100 | Drive tool |
| 101 | Handle |
| 102 | Bit of the drive tool |
| 103 | Mechanism |
| 103a | Bar of the mechanism |
| 103b | Flange of the mechanism |
| 104 | Depth sensors |
| 105 | Fastening surface |
| 106 | Control unit |
| 107 | Extendable arm |
| 108a | First actuator |
| 108b | Second actuator |
| 108c | Third actuator |
| 109 | Fastener |
| 109a | Head portion of fastener |
| 110 | Accelerometer |
| 111 | Power source |
| 112 | Contact sensor |
| 114, 115, 116, 117, 118 and 119 | Steps in flow chart |
| A-A | Axis of fastener or screw |

What is claimed is:

1. A screw driver, comprising:

a handle;

a bit movably coupled to the handle through a mechanism;

a plurality of imaging units provisioned on the handle, wherein the plurality of imaging units faces a screw and a screwing surface; and a control unit operatively coupled to the mechanism and the plurality of imaging units, the control unit is configured to:

receive, data associated with distances between the screwing surface and at least two faces of head of the screw, from each of the plurality of imaging units;

identify a tilt in axis of the screw with respect to the screwing surface when the distances between the screwing surface and the at least two faces of the head of the screw are different; and automatically operate, the mechanism selectively to move the bit laterally and longitudinally for aligning the screw perpendicular to the screwing surface to remove the tilt, based on the data received from at least one of the plurality of imaging units.

2. The screw driver as claimed in claim 1 comprises a contact sensor provisioned on the bit, the contact sensor is configured to detect contact of the bit with the screw.

3. The screw driver as claimed in claim 1 further comprising at least one extendable and retractable arm to hold the screw driver on the screwing surface.

4. The screw driver as claimed in claim 3, wherein the control unit actuates the at least one extendable and retractable arm to extend up to the screwing surface, upon receiving a signal from a contact sensor.

5. The screw driver as claimed in claim 1, wherein the plurality of imaging units is RGB-D camera.

6. The screw driver as claimed in claim 1, wherein the mechanism comprises a first actuator and a second actuator, the first actuator and the second actuator are interfaced with the control unit.

7. The screw driver as claimed in claim 6, wherein the control unit is configured to selectively operate the first actuator and the second actuator to move the bit in lateral and longitudinal directions based on the signal received from the plurality of imaging units.

8. The screw driver as claimed in claim 1 further comprises a third actuator coupled to the bit, the third actuator is interfaced with the control unit.

9. The screw driver as claimed in claim 8, wherein the control unit is configured to rotate the third actuator to fasten the screw to the screwing surface upon aligning the screw perpendicular to the screwing surface.

10. The screw driver as claimed in claim 9, wherein the control unit is configured to: deactivate, the third actuator, upon the distance between the head of the screw and the screwing surface reaching zero.

11. The screw driver as claimed in claim 1 comprises an accelerometer to detect change in acceleration of the bit during fastening.

12. The screw driver as claimed in claim 11, wherein the accelerometer is communicatively coupled to the control unit, the control unit is further configured to deactivate, a third actuator, upon receiving a signal from the accelerometer.

13. The screw driver as claimed in claim 1 comprises at least one power source to supply power to the control unit, a contact sensor, the plurality of imaging units, an accelerometer, a first actuator, a second actuator and a third actuator.

* * * * *